US012809172B2

(12) United States Patent
Jeong et al.

(10) Patent No.: US 12,809,172 B2
(45) Date of Patent: Nov. 24, 2026

(54) PROJECTION LENS OPTICAL SYSTEM, PROJECTION DEVICE EMPLOYING THE SAME, AND WEARABLE DEVICE

(71) Applicant: SAMSUNG ELECTRONICS CO., LTD., Suwon-si (KR)

(72) Inventors: Youngmo Jeong, Suwon-si (KR); Myongjo Choi, Suwon-si (KR); Jongchul Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 721 days.

(21) Appl. No.: 18/202,589

(22) Filed: May 26, 2023

(65) Prior Publication Data

US 2023/0375836 A1 Nov. 23, 2023

Related U.S. Application Data

(63) Continuation of application No. PCT/KR2023/006784, filed on May 18, 2023.

(30) Foreign Application Priority Data

May 19, 2022 (KR) ........................ 10-2022-0061649
Jun. 2, 2022 (KR) ........................ 10-2022-0067696

(51) Int. Cl.
*G02B 27/01* (2006.01)
*G02B 9/62* (2006.01)
(Continued)

(52) U.S. Cl.
CPC ........... *G02B 27/0172* (2013.01); *G02B 9/62* (2013.01); *G02B 13/0045* (2013.01); *G02B 13/16* (2013.01); *G02B 2027/0178* (2013.01)

(58) Field of Classification Search
CPC .. G02B 27/0172; G02B 9/62; G02B 13/0045; G02B 13/16; G02B 2027/0178
See application file for complete search history.

(56) References Cited

U.S. PATENT DOCUMENTS 6,471,359 B1 * 10/2002 Kim ........................ G02B 13/22 359/651
6,917,479 B2 7/2005 Park
(Continued)

FOREIGN PATENT DOCUMENTS

JP 2015-7748 A 1/2015
JP 2019-211491 A 12/2019
(Continued)

OTHER PUBLICATIONS

Izyum, 35KP-1,8/65 Lens, 1965; screen grabbed at https://radojuva.com/en/2023/08/35kp-f-1-8-65mm/ (Year: 1965).*
(Continued)

*Primary Examiner* — Peter Radkowski
(74) *Attorney, Agent, or Firm* — Sughrue Mion, PLLC

(57) ABSTRACT

Provided are a projection lens optical system, and a projection device and a wearable device including the projection device. The projection lens optical system is used in a projection device of a wearable device and includes a first lens, a second lens, a third lens, a fourth lens, a fifth lens, and a sixth lens, sequentially arranged from an emission area to an image plane, wherein the first lens has a positive refractive power, the second lens has a negative refractive power, the third lens has a positive refractive power, the fourth lens has a negative refractive power, the fifth lens has a negative refractive power, and the sixth lens has a positive refractive power, wherein the projection lens optical system satisfy the following Conditional Expression:

$L_B/f \leq 0.5.$

12 Claims, 12 Drawing Sheets

(51) Int. Cl.
*G02B 13/00* (2006.01)
*G02B 13/16* (2006.01)

(56) References Cited

U.S. PATENT DOCUMENTS

| | | | | |
|---|---|---|---|---|
| 6,940,891 | B2 * | 9/2005 | Clary | G02B 27/62 372/107 |
| 6,999,247 | B2 * | 2/2006 | Kim | G02B 13/04 359/717 |
| 7,075,727 | B2 * | 7/2006 | Jeon | G02B 9/34 348/E5.142 |
| 7,085,066 | B2 * | 8/2006 | Neil | G02B 13/08 359/710 |
| 7,414,781 | B2 * | 8/2008 | Mann | G03F 7/70233 359/650 |
| 7,719,772 | B2 * | 5/2010 | Mann | G02B 17/0663 359/650 |
| 8,169,694 | B2 * | 5/2012 | Mann | G03F 7/70233 359/650 |
| 8,451,318 | B2 * | 5/2013 | Trubko | G02B 17/0824 348/335 |
| 9,465,300 | B2 * | 10/2016 | Mann | G02B 17/0663 |
| 9,756,300 | B2 | 9/2017 | Sheng | |
| 10,120,175 | B2 | 11/2018 | Shi et al. | |
| 10,627,607 | B2 | 4/2020 | Lee et al. | |
| 10,983,442 | B2 | 4/2021 | An et al. | |
| 11,046,249 | B2 * | 6/2021 | Chang | G02B 9/64 |
| 11,208,053 | B2 * | 12/2021 | Chang | B60R 1/26 |
| 11,427,174 | B2 * | 8/2022 | Chang | G02B 13/0045 |
| 11,511,740 | B2 * | 11/2022 | Chang | G02B 9/14 |
| 11,893,755 | B2 * | 2/2024 | Valli | G06T 7/536 |
| 12,044,847 | B2 * | 7/2024 | Chang | G02B 13/18 |
| 2004/0027497 | A1 * | 2/2004 | Jeon | G02B 9/34 348/E5.142 |
| 2005/0053113 | A1 * | 3/2005 | Clary | G02B 27/62 359/705 |
| 2005/0117228 | A1 * | 6/2005 | Kim | G02B 13/16 359/793 |
| 2006/0007981 | A1 * | 1/2006 | Clary | G02B 9/34 372/107 |
| 2006/0050403 | A1 * | 3/2006 | Neil | G02B 13/08 359/671 |
| 2007/0058269 | A1 * | 3/2007 | Mann | G02B 17/0663 359/726 |
| 2007/0229984 | A1 * | 10/2007 | Shinohara | G02B 13/0045 359/763 |
| 2009/0046357 | A1 * | 2/2009 | Mann | G02B 17/0663 359/350 |
| 2009/0262443 | A1 * | 10/2009 | Mann | G03F 7/70308 359/857 |
| 2010/0201781 | A1 * | 8/2010 | Trubko | G02B 17/0824 348/36 |
| 2012/0188525 | A1 * | 7/2012 | Mann | G02B 17/0663 355/77 |
| 2014/0071539 | A1 * | 3/2014 | Gao | G02B 27/0172 359/737 |
| 2018/0067290 | A1 * | 3/2018 | Takahashi | G02B 17/086 |
| 2020/0215973 | A1 * | 7/2020 | Chang | H04N 7/183 |
| 2020/0215991 | A1 * | 7/2020 | Chang | B60R 1/04 |
| 2020/0216065 | A1 * | 7/2020 | Chang | H04N 23/60 |
| 2020/0218945 | A1 * | 7/2020 | Chang | G02B 13/0045 |
| 2020/0406874 | A1 * | 12/2020 | Chang | G02F 1/155 |
| 2021/0133994 | A1 * | 5/2021 | Valli | G02B 27/017 |
| 2021/0271055 | A1 | 9/2021 | Kuo et al. | |
| 2021/0278638 | A1 | 9/2021 | Sekine | |
| 2023/0145024 | A1 * | 5/2023 | Chang | G06V 20/10 701/1 |
| 2024/0087150 | A1 * | 3/2024 | Valli | H04N 13/344 |

FOREIGN PATENT DOCUMENTS

| | | | |
|---|---|---|---|
| KR | 10-1994-0013191 | A | 6/1994 |
| KR | 10-0410964 | B1 | 12/2003 |
| KR | 10-0509370 | B1 | 8/2005 |
| KR | 10-1467866 | B1 | 12/2014 |
| KR | 10-2015-0004774 | A | 1/2015 |
| KR | 10-1483978 | B1 | 1/2015 |
| KR | 10-2017-0129258 | A | 11/2017 |
| KR | 10-2018-0095276 | A | 8/2018 |
| KR | 10-2019-0106199 | A | 9/2019 |
| KR | 10-2020-0057037 | A | 5/2020 |
| WO | 2009/136393 | A1 | 11/2009 |

OTHER PUBLICATIONS

Stone, M. David, Understanding Lens Offset and Lens Shift, Projector Central, 2019 available at https://www.projectorcentral.com/Understanding-Lens-Offset-and-Lens-Shift.htm (Year: 2019).*

Krajancich et al., Optimizing Depth Perception in Virtual and Augmented Reality through Gaze-contingent Stereo Rendering, ACM Trans. Graph., vol. 39, No. 6, Article 270. Publication date: Dec. 2020. (Year: 2020).*

International Search Report and Written Opinion (PCT/ISA/210 & 237) dated Aug. 29, 2023 issued by the International Searching Authority in counterpart International Application No. PCT/KR2023/006784.

* cited by examiner

PROJECTION LENS OPTICAL SYSTEM, PROJECTION DEVICE EMPLOYING THE SAME, AND WEARABLE DEVICE

CROSS-REFERENCE TO RELATED APPLICATION(S)

This application is a continuation application, claiming priority under § 365(c), of an International application No. PCT/KR2023/006784, filed on May 18, 2023, which is based on and claims the benefit of a Korean patent application number 10-2022-0061649, filed on May 19, 2022, in the Korean Intellectual Property Office, and of a Korean patent application number 10-2022-0067696, filed on Jun. 2, 2022, in the Korean Intellectual Property Office, the disclosure of each of which is incorporated by reference herein in its entirety.

BACKGROUND

1. Field

The disclosure relates to a projection lens optical system, and a projection device and a wearable device including the same.

2. Description of Related Art

A projection device is applicable to wearable devices that provide virtual reality (VR), augmented reality (AR), mixed reality (MR), and the like. Since wearable devices such as augmented reality glasses are required to be small size and light weight, attempts have been made to remove a prism for a light source unit so that a projection device used in the wearable devices may be implemented with a much smaller volume compared to projection devices according to the related art.

In projection devices according to the related art, Liquid Crystal on Silicon (LCoS) and Digital Micromirror Device (DMD) are used as display panels. Since these LCoS and DMDs require light combiners such as a polarizing beam splitter (PBS) and a prism, or an illumination optical system, there is a limit to reducing the total volume. Thus, there is a need for a projection lens optical system suitable for wearable devices that are to use small and lightweight parts.

SUMMARY

A first problem to be solved is to provide a projection lens optical system that has a small form factor suitable for a wearable device, and a projection device including the same.

Another problem to be solved is to provide a projection lens optical system capable of responding to self-emissive display panels such as micro light-emitting diode (micro LED) and organic light-emitting diode (OLED), a projection device and a wearable device employing the same.

The technical problems to be solved are not limited to the technical problems described above, and other technical problems may exist.

A projection lens optical system according to an aspect of the disclosure is used in a projection device of a wearable device, and includes a first lens, a second lens, a third lens, a fourth lens, a fifth lens and a sixth lens, hereinafter the first to sixth lenses, sequentially arranged from an emission area to an image plane. The first to sixth lenses sequentially have positive, negative, positive, negative, negative, and positive refractive power, and satisfy the Conditional Expression:

$L_B/f \leq 0.5$. Here, $L_B$ denotes a distance from an incident surface of the sixth lens to the image plane, and f denotes a focal length of the projection lens optical system.

In an embodiment of the disclosure, the first, second, third, and fourth lenses may be aspheric lenses, and the fifth lens and the sixth lens may be spherical.

A projection lens optical system according to another aspect of the disclosure is used in a projection device of a wearable device, and includes first to sixth lenses sequentially arranged from an emission area to an image plane, wherein the first to sixth lenses sequentially have positive, negative, negative, positive, negative, and positive refractive power, and satisfy the Conditional Expression: $L_B/f \leq 0.5$. Here, $L_B$ denotes a distance between an incident surface of the sixth lens to the image plane, and f denotes a focal length of the projection lens optical system.

In an embodiment of the disclosure, the first, second, and fifth lenses may be aspheric lenses, and the third, fourth, and the sixth lens may be spherical.

In an embodiment of the disclosure, the projection lens optical system may further satisfy the Conditional Expression: $L_T/f \leq 1.5$. Here, $L_T$ denotes a total distance from an exit surface of the first lens to the image plane, and f denotes a focal length of the projection lens optical system.

In an embodiment of the disclosure, Ω denotes a field of view of the projection lens optical system. In an embodiment of the disclosure, the projection lens optical system may further satisfy the Conditional Expression: $\Omega \geq 30$ degrees.

In an embodiment of the disclosure CRA denotes a chief ray angle between a chief ray and an optical axis on the image plane. In an embodiment of the disclosure, the projection lens optical system may further satisfy the Conditional Expression: CRA<15 degrees.

In an embodiment of the disclosure, the third lens and the fourth lens may be a doublet lens.

In an embodiment of the disclosure, the any of the lens included in the first lens to the sixth lens may include a glass material.

A projection device according to another aspect of the disclosure is used in a wearable device, and includes a self-emissive display panel including pixels composed of self-emissive elements, and a projection lens optical system configured to project image light formed on an image plane of the self-emissive display panel, the projection lens optical system including first to sixth lenses sequentially arranged from an emission area to an image plane, wherein the first to sixth lenses sequentially have positive, negative, positive, negative, negative, and positive refractive power, and satisfy the Conditional Expression: $L_B/f \leq 0.5$. Here, $L_B$ denotes a distance from an incident surface of the sixth lens to the image plane, and f denotes a focal length of the projection lens optical system.

A projection device according to another aspect of the disclosure is used in a wearable device, and includes a self-emissive display panel including pixels composed of self-emissive elements, and a projection lens optical system configured to project image light formed on an image plane of the self-emissive display panel, the projection lens optical system including first to sixth lenses sequentially arranged from an emission area to an image plane, wherein the first to sixth lenses sequentially have positive, negative, negative, positive, negative, and positive refractive power, and satisfy the Conditional Expression: $L_B/f \leq 0.5$. Here, $L_B$ denotes a distance from an incident surface of the sixth lens to the image plane, and f denotes a focal length of the projection lens optical system.

In an embodiment of the disclosure, the self-emissive display panel may include a micro light-emitting diodes (micro LED) panel or an organic light-emitting diode (OLED) panel.

A wearable device according to another aspect of the disclosure includes a projection device configured to output image light, and an image combiner configured to guide light output from the projection device, to an eye motion body of a user, wherein the projection device includes a self-emissive display panel including pixels composed of self-emissive elements, and a projection lens optical system configured to project image light formed on an image plane of the self-emissive display panel, the projection lens optical system including first to sixth lenses sequentially arranged from an emission area to an image plane, wherein the first to sixth lenses sequentially have positive, negative, positive, negative, negative, and positive refractive power, and satisfy the Conditional Expression: $L_B/f \leq 0.5$. Here, $L_B$ denotes a distance from an incident surface of the sixth lens to the image plane, and f denotes a focal length of the projection lens optical system.

A wearable device according to another aspect of the disclosure includes a projection device configured to output image light, and an image combiner configured to guide light output from the projection device, to an eye motion body of a user, wherein the projection device includes, a self-emissive display panel including pixels composed of self-emissive elements, and a projection lens optical system configured to project image light formed on an image plane of the self-emissive display panel, the projection lens optical system including first to sixth lenses sequentially arranged from an emission area to an image plane, wherein the first to sixth lenses sequentially have positive, negative, negative, positive, negative, and positive refractive power, and satisfy the Conditional Expression: $L_B/f \leq 0.5$. Here, $L_B$ denotes a distance between an incident surface of the sixth lens to the image plane, and f denotes a focal length of the projection lens optical system.

In an embodiment of the disclosure, the wearable device may include augmented reality glasses or a head-mounted display device.

In an embodiment of the disclosure, the image combiner may include a waveguide, an input-coupling element provided in the waveguide, and an output-coupling element provided in the waveguide, wherein light input into the waveguide through the input-coupling element is output through the output-coupling element.

The disclosed projection lens optical system may maintain telecentricity while having a short back focal length (BFL).

As the disclosed projection lens optical system has a short back focal length, a lens with a smaller F-value in the same diameter may be designed, and a compact and lightweight projection device may be implemented.

Since a projection device using the disclosed projection lens optical system has a smaller form factor than projection devices according to the related art, it may be suitable for wearable devices such as augmented reality/mixed reality (AR/MR).

BRIEF DESCRIPTION OF DRAWINGS

The above and other aspects and features of certain embodiments of the present disclosure will be more apparent from the following description taken in conjunction with the accompanying drawings, in which.

DETAILED DESCRIPTION

Figure 1:
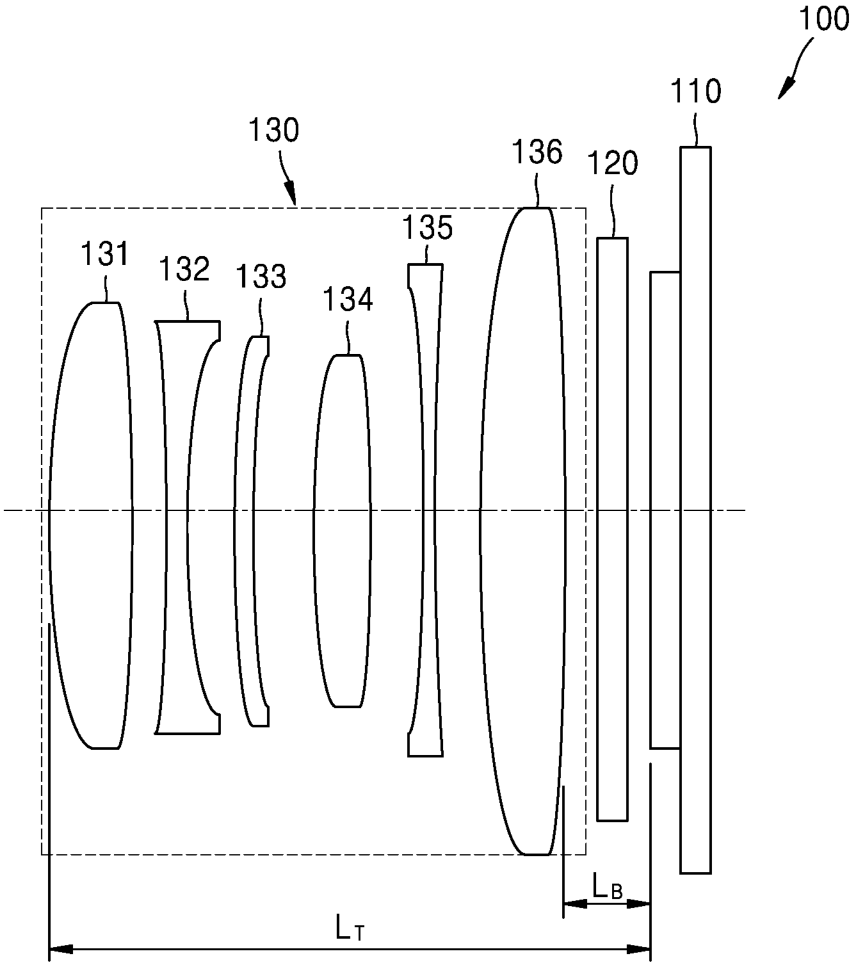
FIG. 1 is a schematic view of a projection device according to an embodiment of the disclosure.

Throughout the disclosure, the expression “at least one of a, b or c” indicates only a, only b, only c, both a and b, both a and c, both b and c, all of a, b, and c, or variations thereof.

Hereinafter, embodiments of the disclosure will be described in detail with reference to the accompanying drawings such that one of ordinary skill in the art may easily implement the disclosure. However, the disclosure may be implemented in various different forms and is not limited to the embodiments described herein. Also, in the drawings, parts irrelevant to the description are omitted in order to clearly describe the disclosure, and like reference numerals designate like elements throughout the specification.

The terms used in this specification are those general terms currently widely used in the art in consideration of functions in regard to the disclosure, but the terms may vary according to the intention of those of ordinary skill in the art, precedents, or new technology in the art. Also, specified terms may be selected by the applicant, and in this case, the detailed meaning thereof will be described in the detailed description of the disclosure. Thus, the terms used in the specification should be understood not as simple names but based on the meaning of the terms and the overall description of the disclosure.

The singular forms include the plural forms unless the context clearly indicates otherwise. In addition, when a part “includes” a certain element, the part may further include another element instead of excluding the other element, unless otherwise stated.

In the following description, an “image plane” refers to a plane on which an image is formed on a display panel, and an “image plane side” may indicate a direction in which the image plane is located. The side opposite to an image plane side of a projection lens optical system is a direction from which light is emitted, and may be, for example, a side facing an image combiner (wave guide) of a wearable device.

Hereinafter, the disclosure will be described in detail with reference to accompanying drawings.

FIG. 1 is a schematic view of a projection device 100 according to an embodiment of the disclosure.

Referring to FIG. 1, the projection device 100 includes a display panel 110 and a projection lens optical system 130.

The display panel 110 may include a self-emissive display panel in which pixels are composed of self-emissive elements. The display panel 110 may include a flat panel device. The display panel 110 may be, for example, a high-brightness self-emissive display panel having a brightness of 5,000 nits or more. Such a high-brightness self-emissive display panel may be implemented using micro light-emitting diodes (micro LEDs) or organic light-emitting diodes (OLEDs).

The projection lens optical system 130 includes six lenses, that is, a first lens 131, a second lens 132, a third lens 133, a fourth lens 134, a fifth lens 135, and a sixth lens 136. The first to sixth lenses 131, 132, 133, 134, 135, and 136 are sequentially arranged from an emission area to the display panel 110 (i.e., image plane). The first to sixth lenses 131, 132, 133, 134, 135, and 136 may include a combination of a spherical lens and an aspheric lens.

In an embodiment of the disclosure, the first to sixth lenses 131, 132, 133, 134, 135, and 136 may sequentially have positive, negative, positive, negative, negative, and positive refractive power, respectively. The first, second, third, and fourth lenses 131, 132, 133, and 134 may be aspheric lenses, and the fifth and sixth lenses 135 and 136 may be spherical lenses, respectively.

In an embodiment of the disclosure, the first to sixth lenses 131, 132, 133, 134, 135, and 136 may sequentially have positive, negative, negative, positive, negative, and positive refractive power, respectively. The first, second, and fifth lenses 131, 132, and 135 may be aspheric lenses, and the third, fourth, and sixth lenses 133, 134, and 136 may be spherical lenses, respectively.

In an embodiment of the disclosure, the third and fourth lenses 133 and 134 may be bonded to form a doublet lens. As the third and fourth lenses 133 and 134 are configured as a doublet lens, chromatic aberration may be suppressed effectively.

In an embodiment of the disclosure, the projection lens optical system 130 may satisfy Conditional Expression 1 below.

$$L_B/f \leq 0.5 \quad \text{[Conditional Expression 1]}$$

Where $L_B$ denotes a back focal length, that is, a distance from an incident surface of the sixth lens 136 to an image plane of the display panel 110.

Conditional Expression 1 relates to a back focal length of the projection lens optical system 130 with respect to a total focal length, and indicates that the projection lens optical system 130 has a relatively short back focal length when compared to the total focal length of the projection lens optical system 130. Conditional Expression 1 corresponds to the display panel 110 being a self-emissive element. In a projection device using a non-self-emissive display panel (e.g., LCoS, DMD) according to the related art, an additional space for illuminating light on the non-self-emissive display panel (e.g., a space where a prism or the like is to be placed) is required between a projection lens optical system and the non-self-emissive display panel. In contrast, in the projection device 100 of the present embodiment, since the display panel 110 is a self-emissive element, a space for illuminating light is not required between the projection lens optical system 130 and the display panel 110, and thus, the projection lens optical system 130 may have a short back focal length as in Conditional Equation 1, and may be arranged just in front of the display panel 110.

The projection lens optical system 130 may further satisfy Conditional Expression 2 below.

$$L_T/f \leq 1.5 \quad \text{[Conditional Expression 2]}$$

Where $L_T$ denotes a distance from an exit surface of the first lens 131 to the image plane of the display panel 110, and f denotes a total focal length of the projection lens optical system 130.

Conditional Expression 2 defines a ratio of a length of the projection lens optical system 130 to the total focal length, and indicates that the projection lens optical system 130 has a relatively short length compared to the total focal length. When the projection lens optical system 130 exceeds an upper limit of Conditional Expression 2, a smaller F-value may be provided and better telecentricity may be achieved, but the length of the projection lens optical system 130 becomes longer.

The projection lens optical system 130 may further satisfy Conditional Expression 3 below.

$$\Omega \geq 30 \text{ degrees} \quad \text{[Conditional Expression 3]}$$

Where Ω denotes a field of view of the projection lens optical system 130.

Conditional Expression 3 shows that the projection lens optical system 130 has a wide field of view, and the projection device 100 employing the projection lens optical system 130 may provide a wide field of view to a wearable device.

The projection lens optical system 130 may further satisfy Conditional Expression 4 below.

$$\text{CRA} < 15 \text{ degrees} \quad \text{[Conditional Expression 4]}$$

Where CRA denotes a chief ray angle between a chief ray and an optical axis on the image plane of the display panel 110. The chief ray is a ray passing through a center of an exit pupil of the projection lens optical system 130 among rays that are output from each pixel of the display panel 110 and constitute a field.

Conditional Expression 4 is for the projection lens optical system 130 to maintain telecentricity, and indicates that an angle of a chief ray emitted from each pixel of the display panel 110 toward the projection lens optical system 130 is to be designed within a maximum of 15 degrees. As the projection lens optical system 130 satisfies Conditional Expression 4, when the projection lens optical system 130 receives light emitted from the display panel 110, the projection lens optical system 130 may have high light efficiency and have a uniform illuminance distribution.

The first to sixth lenses 131, 132, 133, 134, 135, and 136 may include a glass material that is less susceptible to heat. As the projection lens optical system 130 is arranged adjacent to the display panel 110, heat from the display panel 110, which is a self-emissive element, may affect the first to sixth lenses 131, 132, 133, 134, 135, and 136. The heat generation effect by the display panel 110 may be suppressed by the first to sixth lenses 131, 132, 133, 134, 135, and 136 because the first to sixth lenses 131, 132, 133, 134, 135, and 136 include a glass material that is less susceptible to heat.

Lens surfaces of the first to sixth lenses 131, 132, 133, 134, 135, and 136 may be designed to have no inflection point. In an embodiment of the disclosure, the first, second, third, and fourth lenses 131, 132, 133, and 134 may be aspheric lenses, but the lens surfaces of the first, second, third, and fourth lenses 131, 132, and 133, and 134 may be designed to have no inflection point. In an embodiment of the disclosure, the first, second, and fifth lenses 131, 132, and 135 may be aspheric lenses, but the lens surfaces of the first, second, and fifth lenses 131, 132, and 135 may be designed to have no inflection point. As the lens surfaces are designed to have no inflection point, even when the first to sixth lenses 131, 132, 133, 134, 135, and 136 include glass, the manufacturability of the first to sixth lenses 131, 132, 133, 134, 135, and 136 may be improved.

An optical filter 120 may be disposed between the sixth lens 136 and the display panel 110. The optical filter 120 may include, for example, a protection filter or a polarization filter.

A combination of the projection lens optical system 130 and the display panel 110, which is a self-emissive element, as described above, may enable realization of a compact size of the projection device 100, and may be used in wearable devices such as augmented reality glasses or mixed reality equipment.

In addition, in the projection device 100 including the projection lens optical system 130 as described above, at least 20% of a modulation transfer function (MTF) of 100 line pairs (lp) per millimeter may be achieved on the retina, and accordingly, an image at the level of 100 lp/mm may be conveyed.

Next, a projection lens optical system is described with reference to numerical embodiments.

In each numerical embodiment, lens surface numbers (1, 2, 3, . . . , n; n is a natural number) are sequentially arranged from the exit side to the image plane side, and in the drawings, numerals of the lens surfaces, S1, S2, S3, . . . are shown. Y represents radius of curvature, and T represents a thickness of a lens or an air gap between lenses.

An aspheric surface used in the projection lens optical system according to the embodiment of the disclosure is defined as follows.

An aspheric shape may be expressed by the following equation, when the x-axis is the optical axis direction and the y-axis is a direction perpendicular to the optical axis direction, and a traveling direction of the light ray is positive. Here, x is a distance from an apex of a lens in the optical axis direction, y is a distance in the direction perpendicular to the optical axis, K is a conic constant, A, B, C, D, . . . denote aspheric surface coefficients, and c denotes a reciprocal (1/R) of the radius of curvature at the apex of the lens.

⟨Aspheric Surface Equation⟩

$$x = \frac{c^2y^2}{1+\sqrt{1-(K+1)c^2y^2}} + Ay^4 + By^6 + Cy^8 + Dy^{10} \ldots$$

First Embodiment

Figure 2:
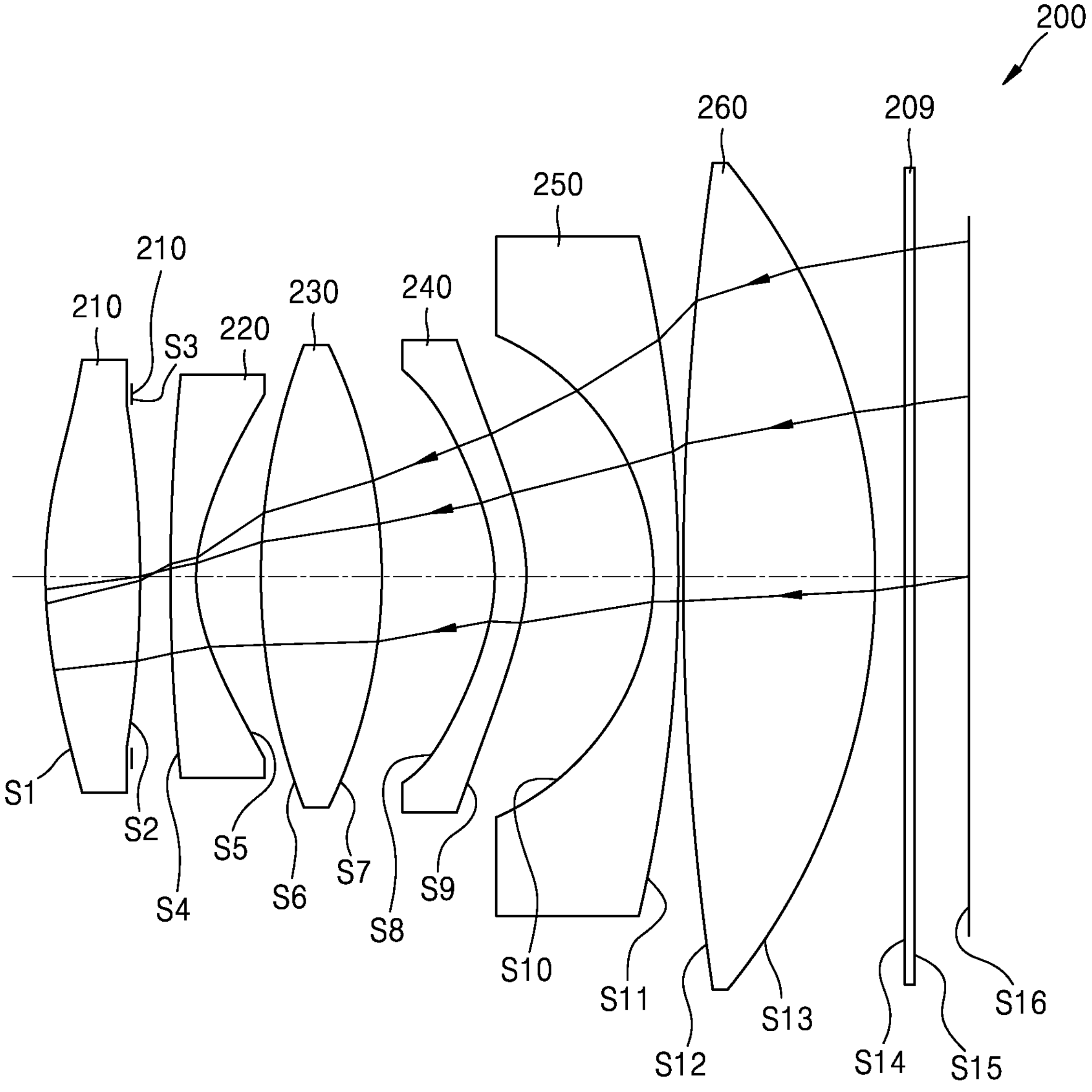
FIG. 2 is a schematic view of a projection lens optical system according to a first embodiment of the disclosure.

FIG. 2 is a schematic view of a projection lens optical system 200 according to a first embodiment, and Table 1 below shows design data of the first embodiment. The disclosure is not limited to this embodiment. This embodiment is merely an example that is not limiting.

Referring to FIG. 2, the projection lens optical system 200 includes first to sixth lenses 210, 220, 230, 240, 250, and 260. In FIG. 2, S3 denotes a stop, S14 and S15 respectively denote an exit surface and an incident surface of an optical filter 209, and S16 denotes an image plane of a display panel.

An F number (Fno) of the projection lens optical system 200 is 2.0, a focal length (f) is about 9 mm, and an angle of view (2ω) is 50°. A length of the image plane S16 is based on 4.40 mm in a diagonal direction.

TABLE 1

| lens surface number | Object | Y Inf. | T Inf. | refractive index | Abbe's number (v) |
|---|---|---|---|---|---|
| 1 | Asphere | 6.135 | 1.154 | 1.883 | 40.7 |
| 2 | Asphere | −7.950 | −0.144 | | |
| 3 | Stop | Inf. | 0.537 | | |
| 4 | Asphere | 12.5 | 0.3 | 1.7 | 27.42 |
| 5 | Asphere | 1.952 | 0.7894 | | |
| 6 | Asphere | 7.780 | 1.500 | 1.732 | 54.11 |
| 7 | Asphere | −7.726 | 1.391 | | |
| 8 | Asphere | −2.272 | 0.378 | 1.899 | 21.3 |
| 9 | Asphere | −2.719 | 1.580 | | |
| 10 | Sphere | −3.276 | 0.351 | 1.478 | 69.45 |
| 11 | Sphere | −17.023 | 0.05 | | |
| 12 | Sphere | 34.86 | 2.309 | 1.885 | 40.02 |
| 13 | Sphere | −8.210 | 0.404 | | |
| 14 | Sphere | Inf. | 0.11 | 1.517 | 64.17 |
| 15 | Sphere | Inf. | 0.722 | | |
| 16 | Image | Inf. | −0.0295 | | |

Table 2 below shows the aspheric coefficients of the first embodiment.

TABLE 2

| | Surface 1 | Surface 2 | Surface 4 | Surface 5 | Surface 6 | Surface 7 | Surface 8 | Surface 9 |
|---|---|---|---|---|---|---|---|---|
| Y | 6.135 | −7.950 | 12.5 | 1.952 | 7.780 | −7.726 | −2.272 | −2.719 |
| K | −5.754 | −0.207 | −2.557 | −4.721 | −48.141 | −0.144 | −3.114 | −4.062 |
| A | 0.00180 | 0.0202 | −0.0226 | −0.00374 | 0.00921 | −0.00112 | −0.00625 | −0.00587 |
| B | −0.00075 | −0.00861 | 0.0163 | 0.0107 | −0.00239 | 0.000708 | 0.00548 | 0.00644 |
| C | 0.000397 | 0.00362 | −0.00842 | −0.00706 | 0.000942 | −3.27E−04 | −0.00145 | −0.00249 |
| D | −2.13E−04 | −0.00122 | 0.00319 | 0.00304 | −0.00023 | 0.000126 | 0.000101 | 0.000803 |
| E | 7.68E−05 | 0.000291 | −0.00088 | −0.00095 | 3.50E−05 | −3.00E−05 | 3.34E−05 | −0.00022 |
| F | −1.80E−05 | −4.45E−05 | 0.000168 | 0.000209 | −4.76E−06 | 2.00E−06 | −1.57E−05 | 3.94E−05 |
| G | 2.63E−06 | 3.88E−06 | −2.06E−05 | −2.97E−05 | 8.57E−07 | 4.49E−07 | 3.24E−06 | −4.31E−06 |
| H | −2.15E−07 | −1.40E−07 | 1.41E−06 | 2.41E−06 | −1.08E−07 | −8.47E−08 | −3.28E−07 | 2.55E−07 |
| J | 7.50E−09 | −7.88E−10 | −3.92E−08 | −8.33E−08 | 5.29E−09 | 4.04E−09 | 1.28E−08 | −6.27E−09 |

Figure 3:
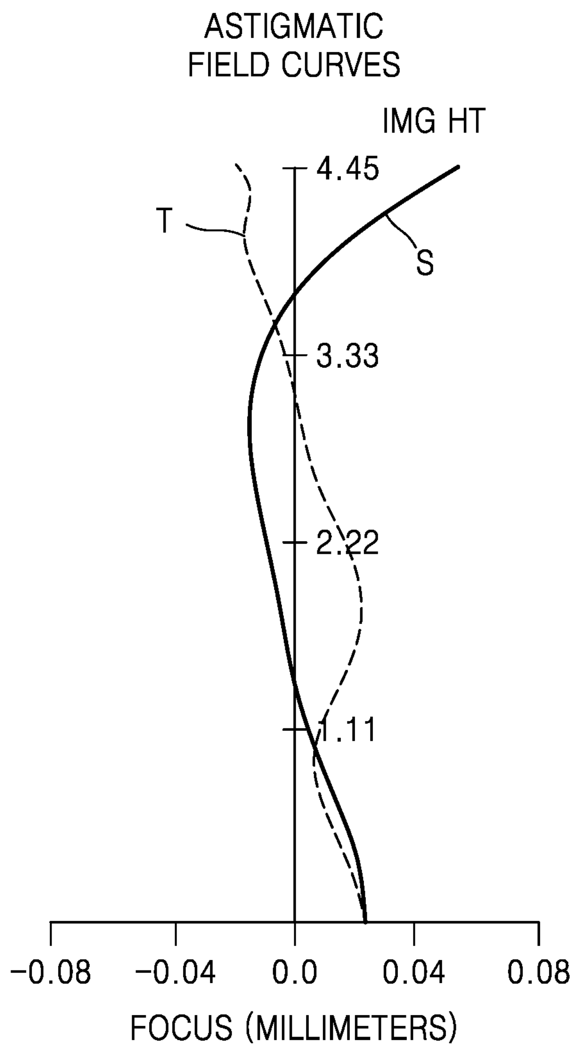
FIG. 3 is a graph showing astigmatism of the projection lens optical system of FIG. 2.
Figure 4:
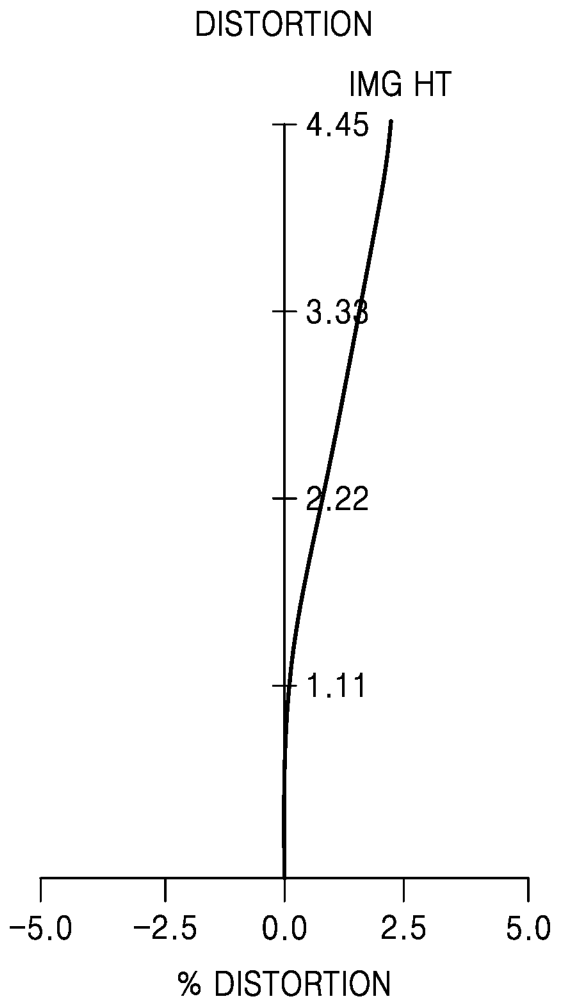
FIG. 4 is a graph showing distortion of the projection lens optical system of FIG. 2.
Figure 5:
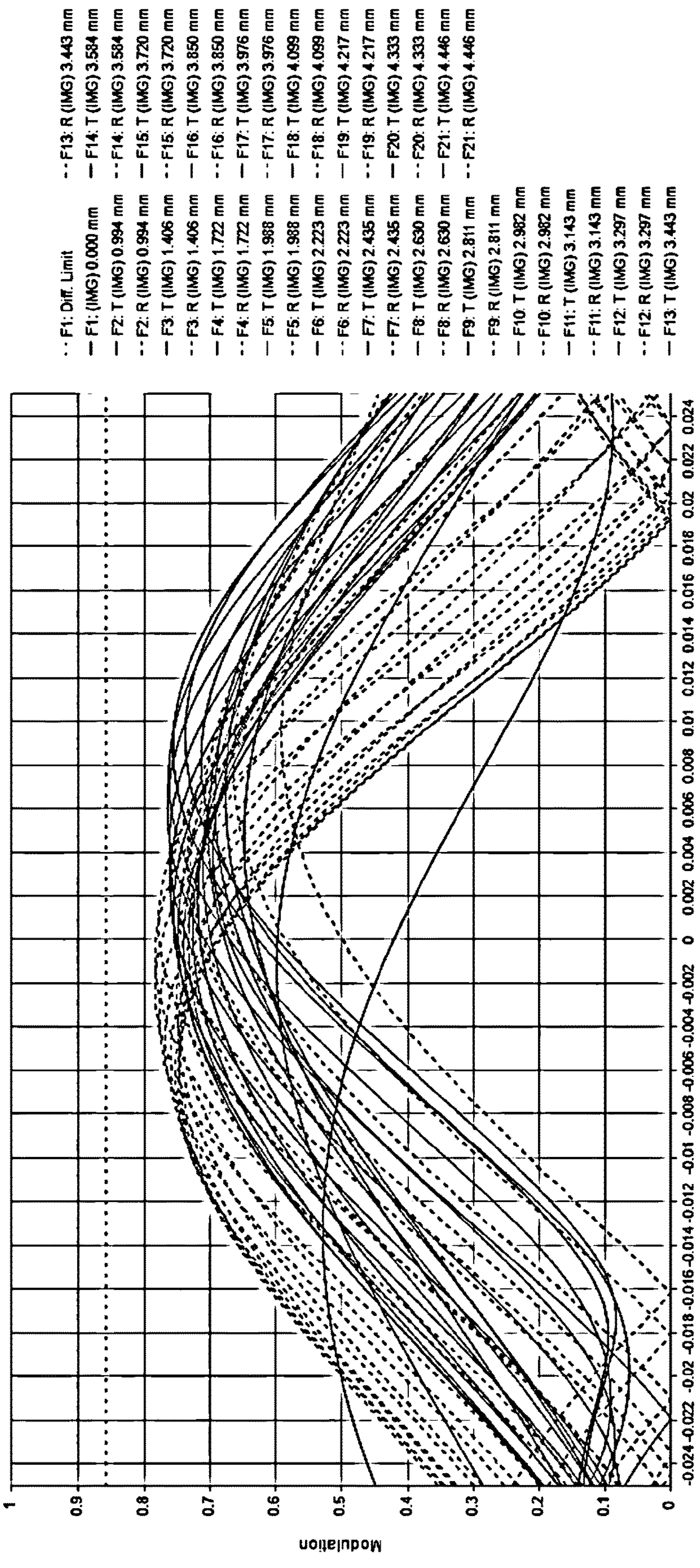
FIG. 5 is a graph showing a through focus modulation transfer function (MTF) of the projection lens optical system of FIG. 2.

FIG. 3 is a graph showing astigmatism of the projection lens optical system 200 of FIG. 2, and FIG. 4 is a graph showing distortion of the projection lens optical system 200 of FIG. 4. In FIGS. 3 and 4, a vertical axis denotes image height IMG HT in units of mm. FIG. 5 is a graph showing a through focus MTF of the projection lens optical system 200 of FIG. 2. In FIG. 5, the horizontal axis represents a defocusing position of the projection lens optical system 200, and the vertical axis represents a modulation size, which is displayed with different curves for respective heights of image planes. Referring to FIG. 5, the projection lens optical system 200 has modulation peaks near defocus 0, which is ideal.

FIGS. 3 to 5 show that the projection lens optical system 200 of FIG. 2 has sufficient optical performance to be used in a projection device of a wearable device.

Second Embodiment

Figure 6:
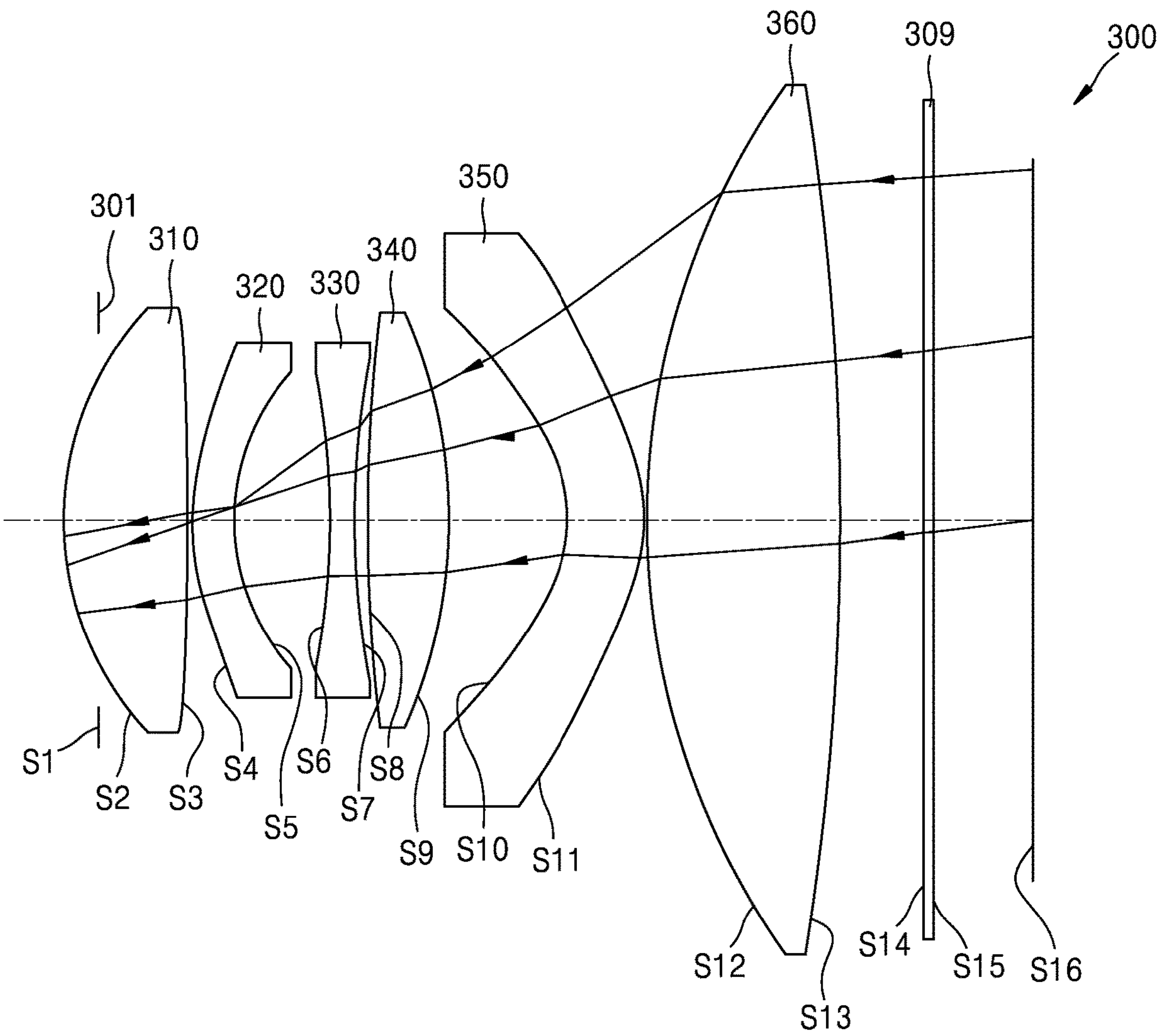
FIG. 6 is a schematic view of a projection lens optical system according to a second embodiment of the disclosure.

FIG. 6 is a schematic view of a projection lens optical system 300 according to a second embodiment, and Table 3 below shows design data of the second embodiment. The disclosure is not limited to this embodiment. This embodiment is merely an example that is not limiting.

Referring to FIG. 6, the projection lens optical system 300 includes first to sixth lenses 310, 320, 330, 340, 350, and 360. In FIG. 6, S1 denotes a stop, S14 and S15 respectively denote an exit surface and an incident surface of an optical filter 309, and S16 denotes an image plane of a display panel.

TABLE 3

| lens surface number | Object | Y Inf. | T Inf. | refractive index | Abbe's number (v) |
|---|---|---|---|---|---|
| 1 | Stop | Inf. | −0.464 | | |
| 2 | Asphere | 3.484 | 1.549 | 1.553 | 71.69 |
| 3 | Asphere | −24.383 | 0.05 | | |
| 4 | Asphere | 3.131 | 0.510 | 1.856 | 37 |
| 5 | Asphere | 2.050 | 1.193 | | |
| 6 | Sphere | −10.419 | 0.3 | 1.705 | 27.18 |
| 7 | Sphere | 10.324 | 0.187 | | |
| 8 | Sphere | 21.506 | 0.993 | 1.883 | 40.74 |
| 9 | Sphere | −6.269 | 1.431 | | |
| 10 | Asphere | −1.735 | 0.947 | 1.896 | 31.1 |
| 11 | Asphere | −2.631 | 0.05 | | |
| 12 | Sphere | 9.154 | 2.353 | 1.742 | 52.76 |
| 13 | Sphere | −37.372 | 1.125 | | |
| 14 | Sphere | Inf. | 0.11 | 1.517 | 64.17 |
| 15 | Sphere | Inf. | 1.209 | | |
| 17 | Sphere | Inf. | 0 | | |

Table 4 below shows the aspheric coefficients of the second embodiment.

TABLE 4

| | Surface 2 | Surface 3 | Surface 4 | Surface 5 | Surface 10 | Surface 11 |
|---|---|---|---|---|---|---|
| Y Radius | 3.484 | −24.383 | 3.131 | 2.050 | −1.735 | −2.631 |
| K | −0.253 | 0 | −5.554 | −1.210 | −0.768 | −0.868 |
| A | 0.00174 | 0.00664 | 0.00569 | −0.0123 | 0.0129 | 0.00529 |
| B | −0.00014 | −0.0026 | −0.00012 | 0.00795 | 0.00344 | 0.00130 |
| C | 0.000236 | 0.000667 | −3.82E−03 | −7.82E−03 | −0.00121 | −0.00027 |
| D | −0.00025 | 7.19E−05 | 3.72E−03 | 0.00693 | 0.000419 | 5.92E−05 |
| E | 0.000139 | −0.00013 | −1.88E−03 | −3.82E−03 | −0.00015 | −1.54E−05 |
| F | −4.41E−05 | 4.61E−05 | 5.67E−04 | 1.30E−03 | 3.75E−05 | 2.55E−06 |
| G | 8.08E−06 | −8.13E−06 | −1.02E−04 | −2.63E−04 | −5.45E−06 | −2.39E−07 |
| H | −7.90E−07 | 7.22E−07 | 1.02E−05 | 2.89E−05 | 4.30E−07 | 1.20E−08 |
| J | 3.19E−08 | −2.54E−08 | −4.25E−07 | −1.35E−06 | −1.43E−08 | −2.50E−10 |

Figure 7:
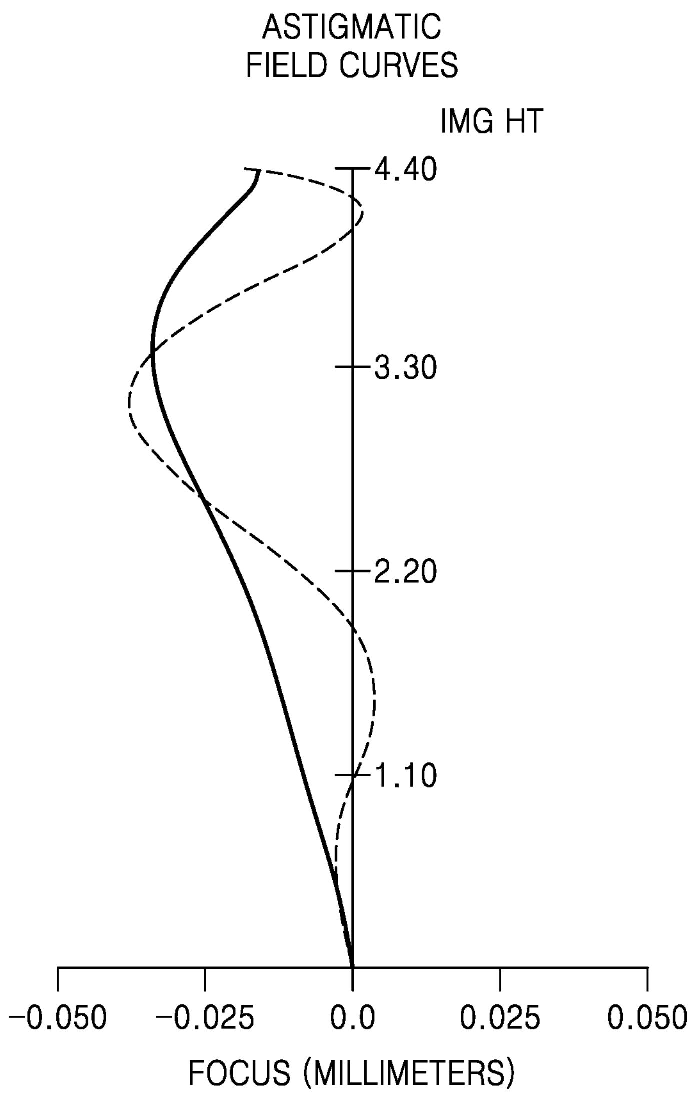
FIG. 7 is a graph showing astigmatism of the projection lens optical system of FIG. 6.
Figure 8:
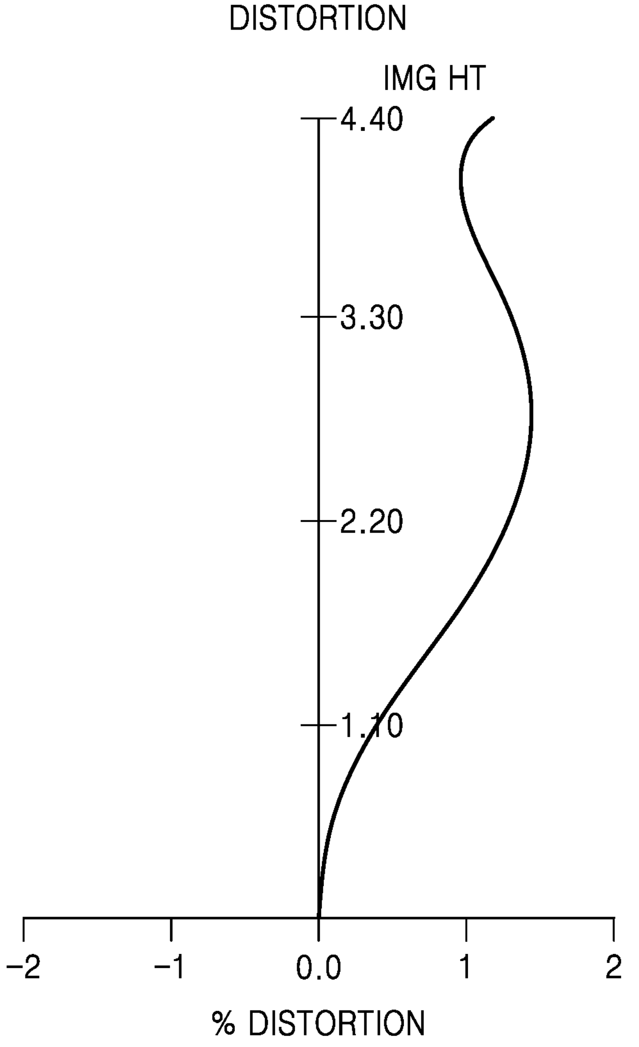
FIG. 8 is a graph showing distortion of the projection lens optical system of FIG. 6.
Figure 9:
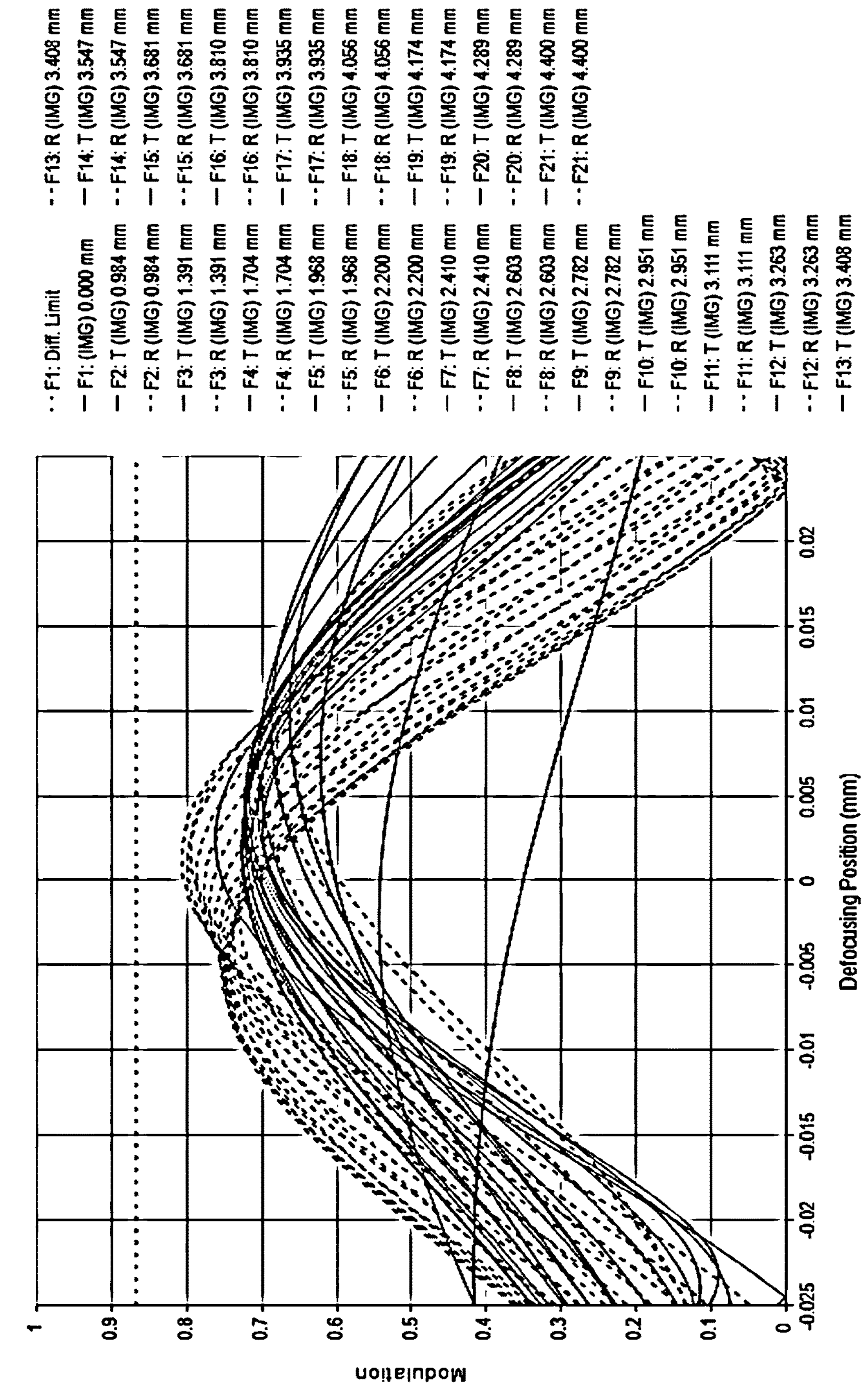
FIG. 9 is a graph showing a through focus MTF of the projection lens optical system of FIG. 6.

FIG. 7 is a graph showing astigmatism of the projection lens optical system 300 of FIG. 6, and FIG. 8 is a graph showing distortion of the projection lens optical system 300 of FIG. 6. In FIGS. 7 and 8, a vertical axis denotes image height IMG HT in units of mm. FIG. 9 is a graph showing a through focus MTF of the projection lens optical system 300 of FIG. 6. FIGS. 7 to 9 show that the projection lens optical system 300 of FIG. 6 has sufficient optical performance to be used in a projection device of a wearable device.

Figure 10:
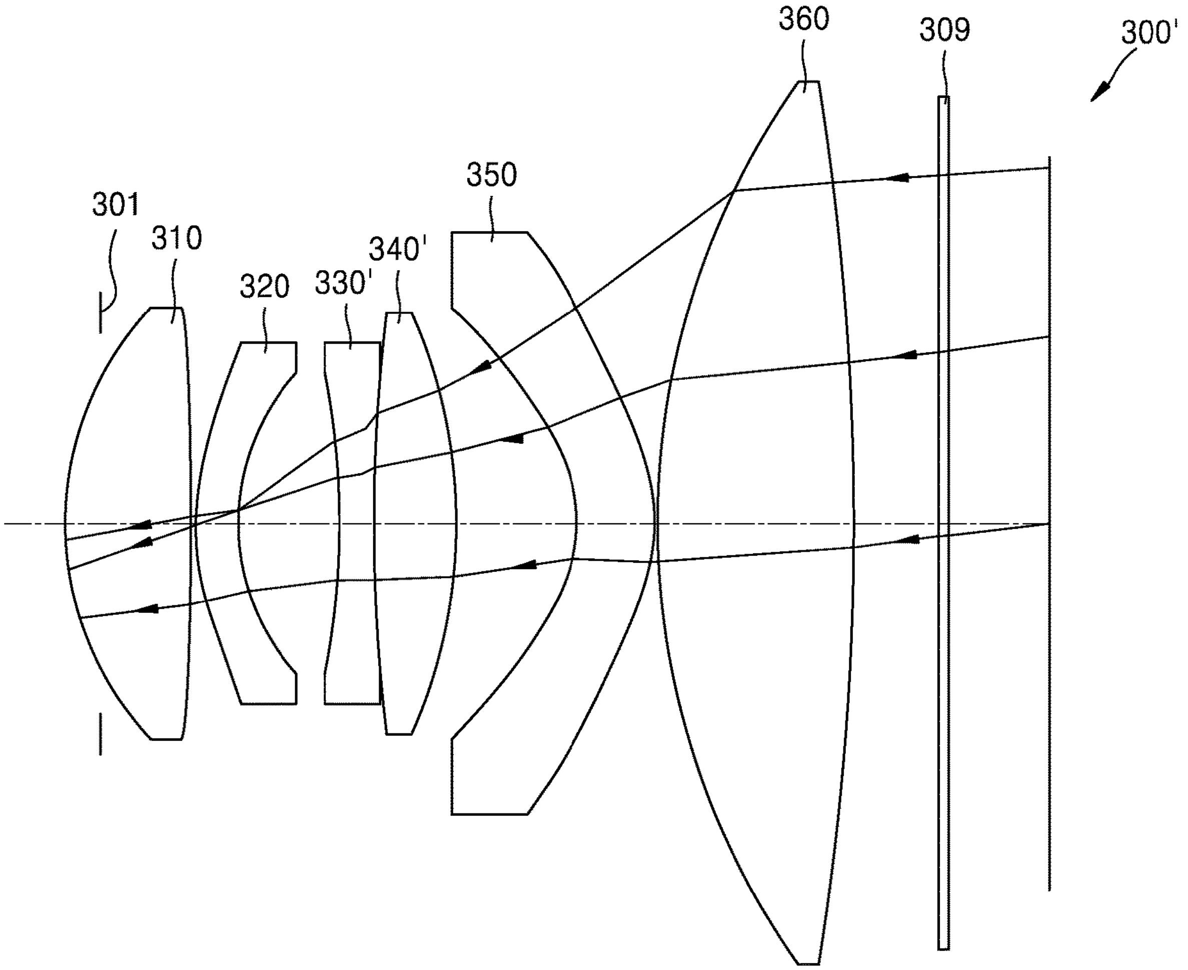
FIG. 10 is a schematic view of a projection lens optical system according to an embodiment of the disclosure.

FIG. 10 is a schematic view of a projection lens optical system 300' according to an embodiment of the disclosure. The projection lens optical system 300' of FIG. 10 is similar to the projection lens optical system 300 described with reference to FIG. 6, but is different in that third and fourth lenses 330' and 340' are bonded together. As the third and fourth lenses 330' and 340' are bonded to form a doublet lens, chromatic aberration may be suppressed more effectively.

Figure 11:
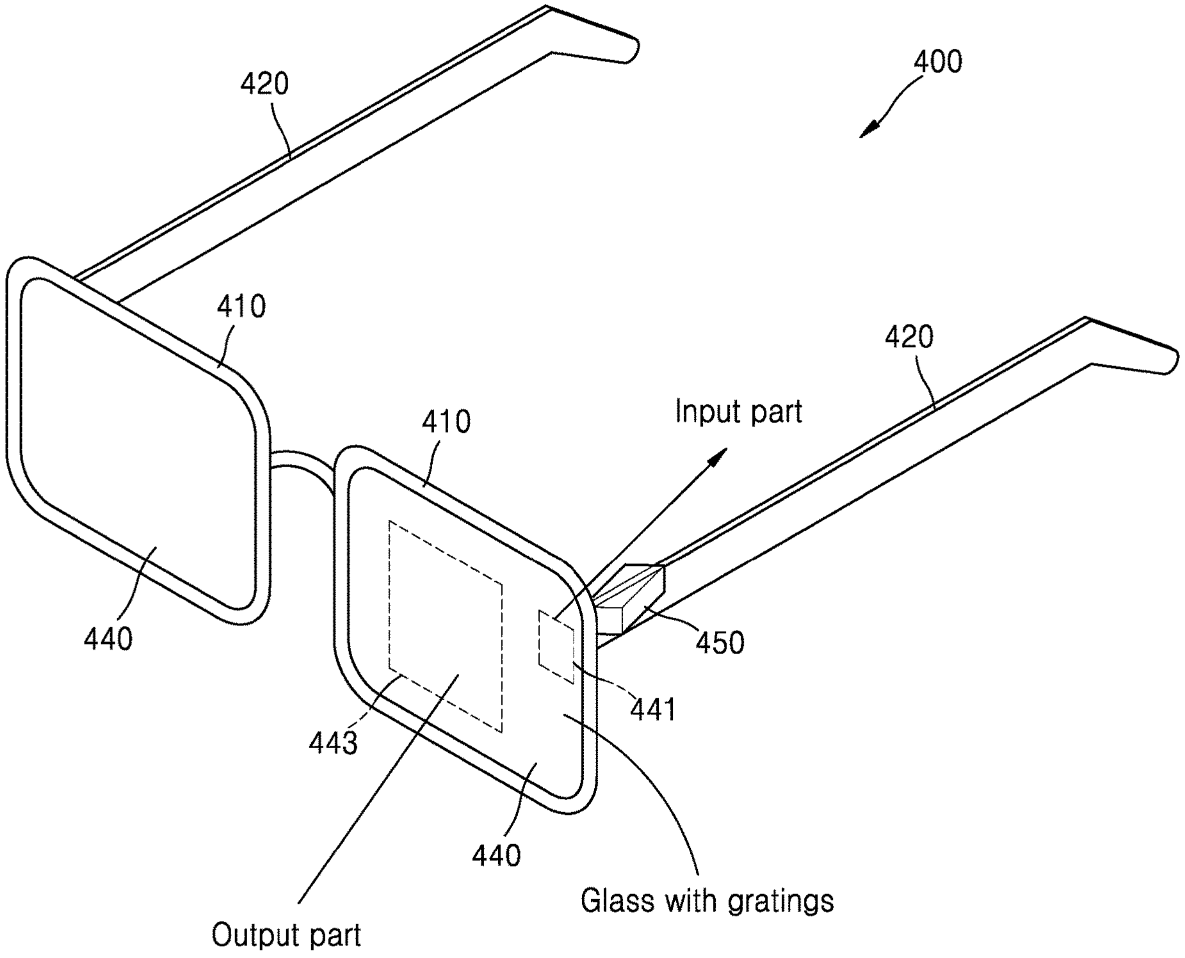
FIG. 11 is a schematic view of a wearable device including a projection device, according to an embodiment of the disclosure.
Figure 12:
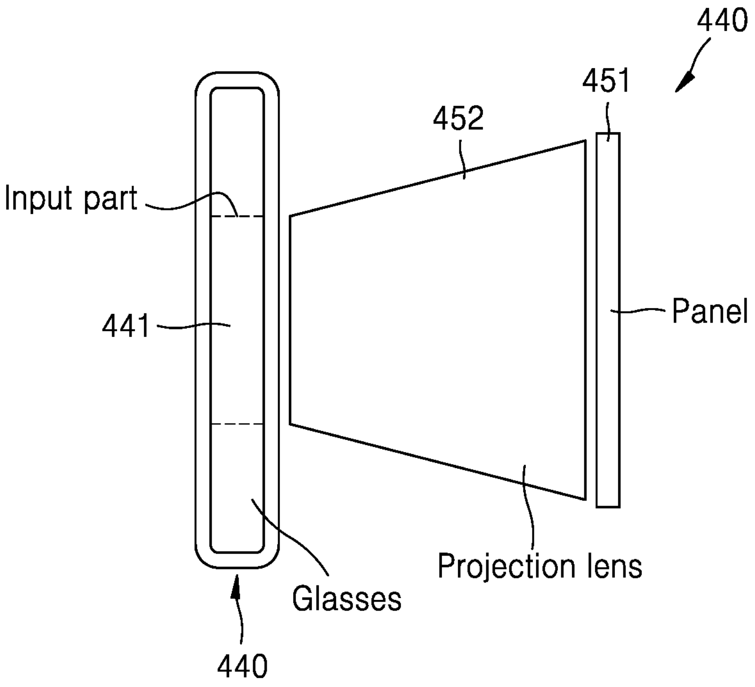
FIG. 12 illustrates an arrangement of a projection device in the wearable device of FIG. 11.

FIG. 11 schematically illustrates a wearable device 400 employing a projection device according to an embodiment of the disclosure. FIG. 12 illustrates an arrangement of a projection device 450 in the wearable device 400 of FIG. 11.

Referring to FIGS. 11 and 12, the wearable device 400 may be a glasses-type display device configured to be worn by a user. The glasses-type display device may be augmented reality glasses.

The wearable device 400 may include a glasses-type body having a frame 410 and temples 420. The frame 410 may have a shape of two rims connected to each other by a bridge, for example. The rims and the bridge of the frame 410 may not be distinguished.

The temples 420 are respectively connected to both ends of the frame 410 and extend in one direction. Both ends of the frame 410 and the temples 420 may be connected to each other by, for example, a hinge. As another example, the frame 410 and the temples 420 may be integrally connected.

A waveguide 440 is fixed to the frame 410. The waveguide 440 is an example of an image combiner. Eyeglasses may be disposed on the frame 410, and in this case, the waveguide 440 may be disposed attached to the eyeglasses or disposed apart from the eyeglasses. The waveguide 440 may include an input-coupling element 441 and an output-coupling element 443. The input-coupling element 441 is positioned on a surface of the waveguide 440 facing the projection device 450 or on a back surface thereof to input light output from the projection device 450, to the waveguide 440. The input light is guided toward the output-coupling element 443 through the waveguide 440, and is output to the target area through the output-coupling element (43 in FIG. 13). Here, a target area may be an eye motion box of a user. The input-coupling element 441 or the output-coupling element 443 may have a grating structure such as a diffractive optical element or a holographic optical element.

The projection device 450 is configured to output light of a virtual image, and may use a projection device employing the projection lens optical system of the above-described embodiment. As illustrated in FIG. 11, the projection device 450 may be fixed to the temples 420, but is not limited thereto. As another example, the projection device 450 may be located anywhere on the rim of the frame 410 (rim shape). The projection device 450 may be provided for each of the left and right eyes. Information processing and image formation for the projection device 450 may be performed directly on a computer of a wearable device itself, or the wearable device may be connected to an external electronic device such as a smart phone, tablet, computer, laptop, or any other intelligent (smart) device, and the information processing and image formation for the projection device 450 may be performed in an external electronic device. Signal transmission between the wearable device and the external electronic device may be performed through wired communication and/or wireless communication. The wearable device may receive power from at least one of a built-in power source (rechargeable battery), an external device, or an external power source.

In the disclosure, the description is focused on an example in which the projection device 450 is applied to augmented reality glasses, but it would be readily understood by those skilled in the art that the projection device 450 is applicable to wearable devices such as virtual reality devices or mixed reality devices capable of expressing virtual reality.

In the disclosure, a 'wearable device' refers to a device that can be worn by a user, such as glasses-shaped augmented reality glasses or goggles-shaped device worn by a user on the face, a head mounted display (HMD) or an augmented reality helmet, a head up display (HUD), and the like, worn on the head.

The projection lens optical system according to the disclosure, and the projection device and the wearable device employing the same have been described with reference to the embodiments shown in the drawings to help understanding, but this is only an example, it will be understood by those with ordinary knowledge in the art that various modifications and equivalent other embodiments may be made therefrom.

What is claimed is:

1. A projection lens optical system of a projection device used in a wearable device, the projection lens optical system comprising:

a first lens, a second lens, a third lens, a fourth lens, a fifth lens, and a sixth lens, sequentially arranged from an emission area to an image plane, wherein the first lens has a positive refractive power, the second lens has a negative refractive power, the third lens has a positive refractive power, the fourth lens has a negative refractive power, the fifth lens has a negative refractive power, and the sixth lens has a positive refractive power, wherein the projection lens optical system satisfies the following Conditional Expression:

$$L_B/f \leq 0.5,$$

wherein $L_B$ denotes a distance from an incident surface of the sixth lens to the image plane, and f denotes a focal length of the projection lens optical system.

2. The projection lens optical system of claim 1, wherein the first, second, third, and fourth lenses are aspheric lenses, and the fifth lens and the sixth lens are spherical.

3. The projection lens optical system of claim 1, wherein the projection lens optical system further satisfies the following Conditional Expression:

$$L_T/f \leq 1.5,$$

wherein $L_T$ denotes a total distance from an exit surface of the first lens to the image plane, and f denotes the focal length of the projection lens optical system.

4. The projection lens optical system of claim 3, wherein the projection lens optical system further satisfies the following Conditional Expression:

$$\Omega \geq 30 \text{ degrees},$$

wherein Ω denotes a field of view of the projection lens optical system.

5. The projection lens optical system of claim 4, wherein the projection lens optical system further satisfies the following Conditional Expression:

$$CRA < 15 \text{ degrees},$$

wherein CRA denotes a chief ray angle between a chief ray and an optical axis on the image plane.

6. The projection lens optical system of claim 1, wherein the third lens and the fourth lens are a doublet lens.

7. The projection lens optical system of claim 1, wherein the first lens to the sixth lens comprise a glass material.

8. A projection device used in a wearable device, the projection device comprising:

a self-emissive display panel comprising pixels composed of self-emissive elements; and a projection lens optical system comprising a first lens, a second lens, a third lens, a fourth lens, a fifth lens, and a sixth lens, sequentially arranged from an emission area to an image plane, wherein the first lens has a positive refractive power, the second lens has a negative refractive power, the third lens has a positive refractive power, the fourth lens has a negative refractive power, the fifth lens has a negative refractive power, and the sixth lens has a positive refractive power, and wherein the projection lens optical system satisfies the following Conditional Expression:

$$L_B/f \leq 0.5,$$

wherein $L_B$ denotes a distance from an incident surface of the sixth lens to the image plane, and f denotes a focal length of the projection lens optical system, wherein the projection lens optical system is configured to project image light formed on an image plane of the self-emissive display panel.

9. The projection device of claim 8, wherein the self-emissive display panel comprises a micro light-emitting diodes (micro LED) panel or an organic light-emitting diode (OLED) panel.

10. A wearable device comprising: the projection device of claim 8, configured to output image light; and an image combiner configured to guide light output from the projection device, to an eye motion body of a user.

11. The wearable device of claim 10, wherein the wearable device comprises augmented reality glasses or a head-mounted display device.

12. The wearable device of claim 10, wherein the image combiner comprises a waveguide, an input-coupling element provided in the waveguide, and an output-coupling element provided in the waveguide, wherein light input into the waveguide through the input-coupling element is output through the output-coupling element.

* * * * *